(12) United States Patent
Park et al.

(10) Patent No.: US 7,528,188 B2
(45) Date of Patent: May 5, 2009

(54) RESIN SOLUTION AND METHOD OF FORMING A PROTECTION LAYER

(75) Inventors: Seok Bong Park, Yongin (KR); Myung Sun Kim, Hwasung (KR); Won Mi Kim, Suwan (KR); Jae Hyun Kim, Incheon (KR); Sang Sik Moon, Hwasung (KR); Chang Ho Lee, Suwon (KR); Young Hoon Kim, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 688 days.

(21) Appl. No.: 10/862,338

(22) Filed: Jun. 8, 2004

(65) Prior Publication Data

US 2005/0085587 A1 Apr. 21, 2005

(30) Foreign Application Priority Data

Oct. 21, 2003 (KR) .................. 10-2003-0073526

(51) Int. Cl.
*C08K 5/10* (2006.01)
*C08K 5/09* (2006.01)
*C08L 71/10* (2006.01)

(52) U.S. Cl. ............... 524/315; 524/320; 524/356; 524/360; 524/376; 524/508; 524/594

(58) Field of Classification Search ........... 524/594, 524/315, 320, 356, 360, 376
See application file for complete search history.

(56) References Cited

U.S. PATENT DOCUMENTS

| 5,554,684 A | 9/1996 | Choi et al. |
| 6,359,062 B1 * | 3/2002 | Mallen ................ 525/58 |
| 6,783,828 B2 * | 8/2004 | Fujimaru et al. ........ 428/40.1 |

FOREIGN PATENT DOCUMENTS

| DE | 1920759 | 1/1970 |
| DE | 69709047 | 4/2003 |
| EP | 1221451 | 7/2002 |

OTHER PUBLICATIONS

Office Action dated Nov. 23, 2005 for corresponding German Application No. 10-2004-051-153.5 (and English translation thereof).

* cited by examiner

*Primary Examiner*—Kriellion A Sanders
(74) *Attorney, Agent, or Firm*—Harness, Dickey & Pierce, P.L.C.

(57) ABSTRACT

A resin solution usable for forming a protection layer, including an organic solvent and a resol resin. The resin solution may further include any combination of a cross-linking agene or agent(s), a photo active compound (PAC) or compounds(s), and/or development accelerator or accelerator(s) a method forming a cured resin layer, including applying a resin solution, including a resol resin, directly or indirectly on a substrate and hard baking the resin solution to form the cured resin layer. The resin solution may include a resol resin and/or a novolac resin.

24 Claims, 4 Drawing Sheets

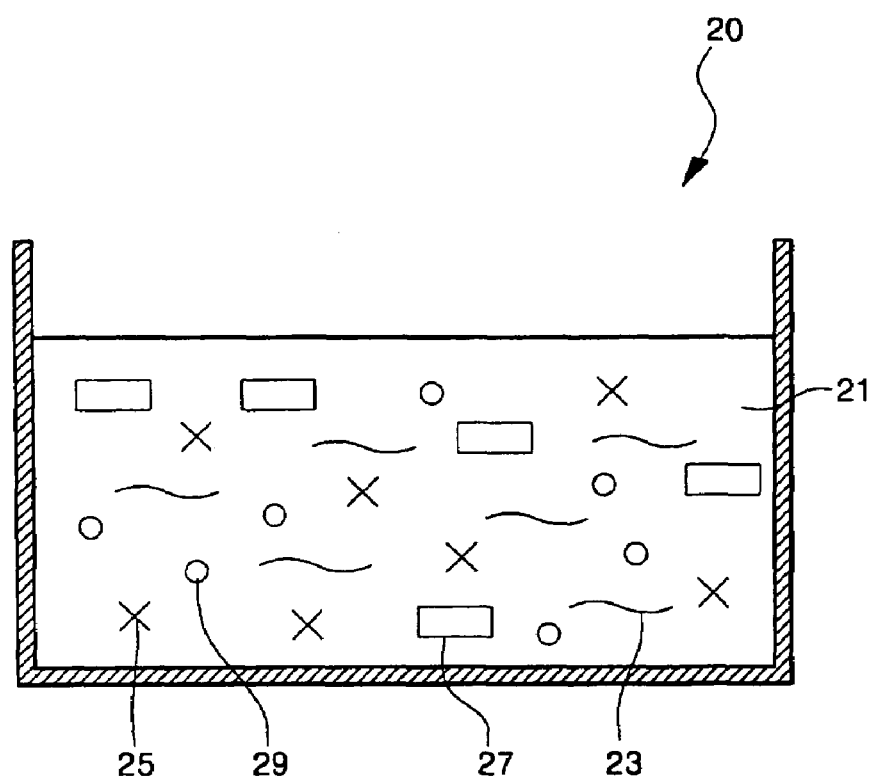
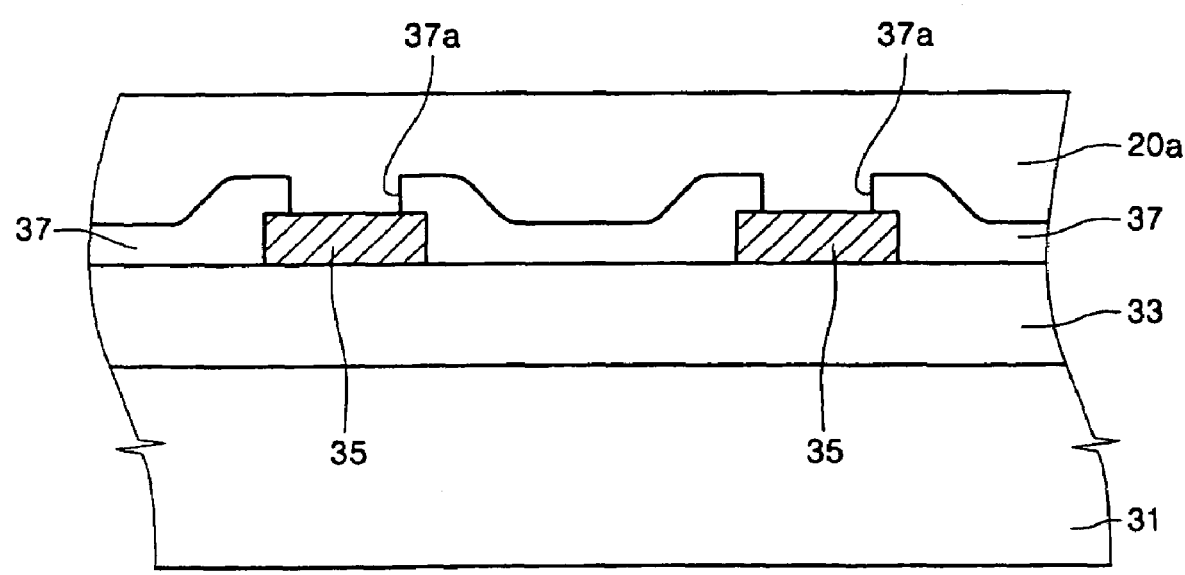

RESIN SOLUTION AND METHOD OF FORMING A PROTECTION LAYER

CROSS-REFERENCE TO RELATED APPLICATIONS

This application claims the benefit under 35 U.S.C. § 119(a) of Korean Patent Application No. 2003-0073526, filed on Oct. 21, 2003, the contents of which are hereby incorporated by reference in their entirety.

BACKGROUND OF THE INVENTION

1. Field of the Invention

The present invention relates to a resin solution and a method of forming a protection layer, and more particularly to a resin solution and a method for forming a protection layer including an organic solvent and a resin.

2. Background of the Invention

Semiconductor devices may be vulnerable to external conditions. Therefore, semiconductor devices are manufactured in clean environments. Upon entry into non-clean environments, it may be necessary for a packaging process to be applied to a semiconductor device to ensure its continued protection. The semiconductor device may be encapsulated by a packaging process to protect the semiconductor device from the external environment. The packaging process may include forming an epoxy molding compound around the semiconductor device.

Prior to the packaging process, a semiconductor device may be covered with a passivation layer and/or a polyimide layer. These layers may assist in maintaining the integrity of the semiconductor device during the packaging process.

The polyimide layer may act as a buffer layer to alleviate stress generated during the packaging process. The polyimide layer may also act as a protection layer against alpha particles which may penetrate the semiconductor device. Alpha particles may have a negative effect on the electric charges created or induced in a depletion layer of a PN junction of the semiconductor device.

In semiconductor memory devices, memory cells may be comprised of data storage elements connected to the PN junction. Alpha particles, which reduce the electric charges of the PN junction, can thus decrease the reliability of semiconductor memory devices. In the case of volatile memory devices, such as a DRAM memory cell, the data storage element may correspond to a cell capacitor and data (charge) stored in the cell capacitor may be lost due to the α-particles.

Conventionally, a polyimide layer is formed from an organic solvent and a polyamic acid. The organic solvent and the polyamic acid may be applied to the semiconductor device and then baked at a temperature of at least 280° C. The baking of the polyimide layer should be processed at a temperature as low as possible to so as to not deteriorate the reliability and/or refresh characteristics of the semiconductor device.

A cross-link reaction must occur between the organic solvent and the polyamic acid to form the polyimide layer. However, a cross-linking reaction occurs only at high temperatures. Using conventional methods, as described in U.S. Pat. No. 5,554,684, this is only possible at temperatures above 280° C. At temperatures above 280° C., there exists the possibility of creating deficiencies within the semiconductor device. These deficiencies can reduce the yield of semiconductor fabrication.

SUMMARY OF THE INVENTION

In an exemplary embodiment, the present invention is directed to a resin solution usable for forming a protection layer, including an organic solvent and a resol resin.

In another exemplary embodiment, the resin may be a resol resin and/or a novolac resin.

In another exemplary embodiment, the present invention is directed to a resin solution usable for forming a protection layer, further including any combination of a cross-linking agent or agent(s), a photo active compound (PAC) or compound(s), and/or a development accelerator or accelerator(s).

In another exemplary embodiment, the present invention is directed to a method forming a cured resin layer, including applying a resin solution, including a resol resin, directly or indirectly on a substrate and hard baking the resin solution to form the cured resin layer.

In another exemplary embodiment, the resin solution includes an organic solvent, a resol resin.

In another exemplary embodiment, the resin solution further includes any combination of a cross-linking agent or agent(s), a photo active compound (PAC) or compound(s), and/or a development accelerator or accelerator(s).

In an exemplary embodiment, the present invention is directed to a novolac solution usable for forming a protection layer, including an organic solvent and a novolac resin.

In an exemplary embodiment, the present invention is directed to a novolac solution further includes any combination of a cross-linking agent or agent(s), a photo active compound (PAC) or compound(s), and/or a development accelerator or accelerator(s).

BRIEF DESCRIPTION OF THE DRAWINGS

Exemplary embodiments of the present invention will become more fully understood from the detailed description given below and the accompanying drawings, which are given for purposes of illustration only, and thus do not limit the invention.

FIG. 2 to FIG. 6 explain the exemplary method of forming the protection layer of FIG. 1, in accordance with an exemplary embodiment of the present invention.

Figure 1:
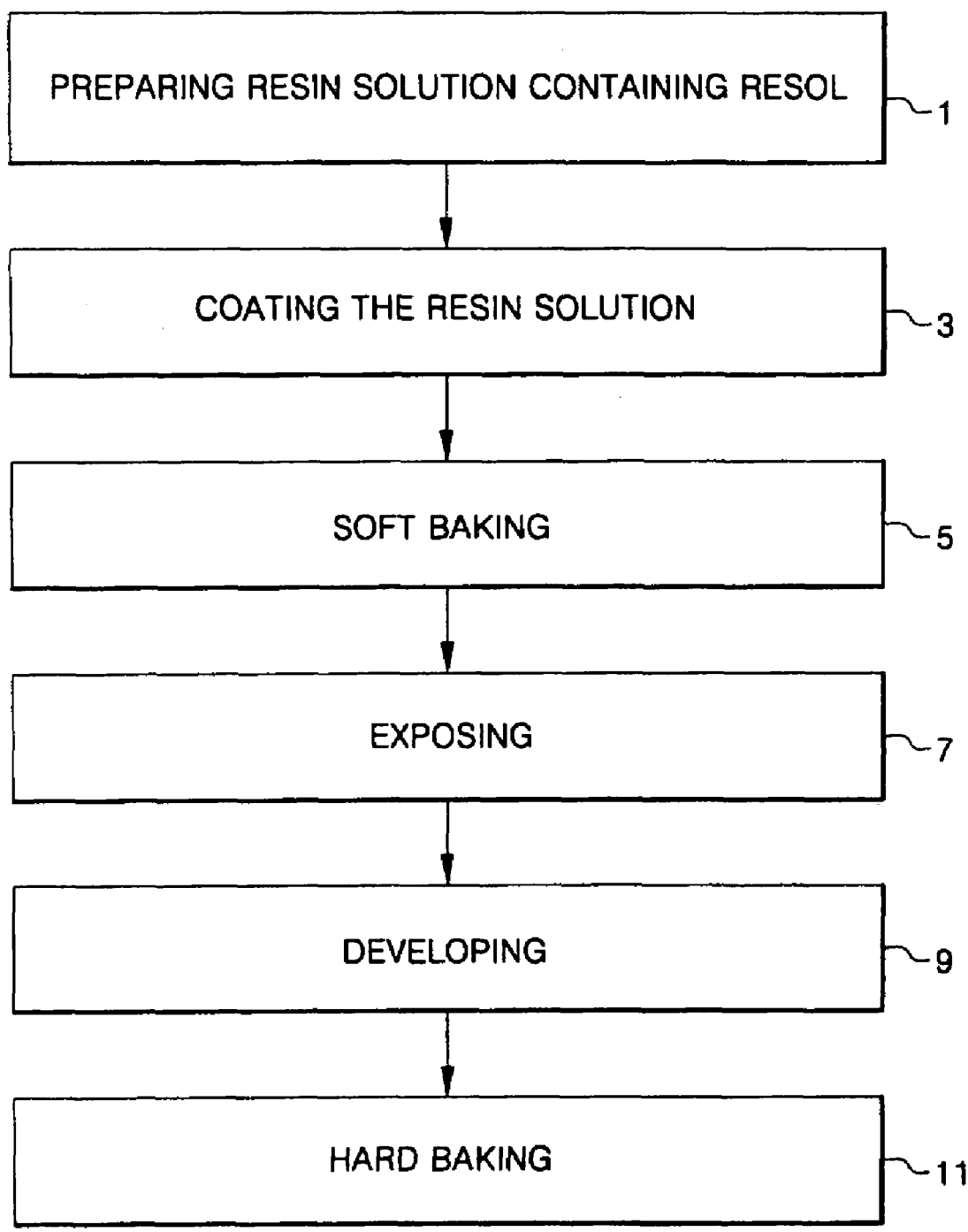
FIG. 1 illustrates a method of forming a protection layer in accordance with an exemplary embodiment of the present invention.

It should be noted that these Figures are intended to illustrate the general characteristics of methods and devices of exemplary embodiments of this invention, for the purpose of the description of such exemplary embodiments herein. These drawings are not, however, to scale and may not precisely reflect the characteristics of any given embodiment, and should not be interpreted as defining or limiting the range of values or properties of exemplary embodiments within the scope of this invention.

In particular, the relative thicknesses and positioning of layers or regions may be reduced or exaggerated for clarity. Further, a layer is considered as being formed "on" another layer or a substrate when formed either directly on the referenced layer or the substrate or formed on other layers or patterns overlaying the referenced layer.

DETAILED DESCRIPTION OF EXEMPLARY EMBODIMENTS OF THE PRESENT INVENTION

In an exemplary embodiment, the resin solution of the present invention includes an organic solvent and a resol resin. In another exemplary embodiment, the resin solution of the present invention includes an organic solvent of 1-methoxy-2-propanol (PGME), 1-methoxy-2-propanol acetate (PGMEA), ethyl lactate (EL), γ-butyro lactone (GBL) and cyclohexanone, and a resol, which is represented by Formula 1.

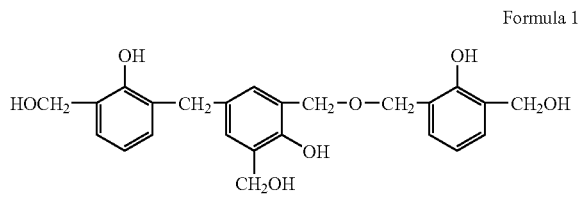

Formula 1

In an exemplary embodiment, the resol has a weight average molecular weight of 800 to 20000 in a solid state. In another exemplary embodiment, the resol has a weight average molecular weight of 7000 to 13000. In another exemplary embodiment, the resin solution can be a mixture of an organic solution having a weight percentage of 40 to 80 and the resol having a weight percentage of 20 to 60.

In another exemplary embodiment, the resin solution may include an organic solvent (as described above), a resol (as described above), and a cross-linking agent. In another exemplary embodiment, the cross-linking agent may accelerate a cross-linking reaction of the resol molecule when the resin solution is hard baked at a temperature of about 120° C. to 250° C. In another exemplary embodiment, the cross-linking agent may be one or more of divinylbenzene (DVB), phthalic anhydride, tetrahydrophthalic, nadic methyl, chloroendic anhydride, phenol-formaldehyde and hexamethylenetetamine. In another exemplary embodiment, the resin solution may include the organic solution of 40 wt % to 70 wt %, the resol of 30 wt % to 60 wt % and the cross-linking agent of 2 wt % to 10 wt %.

In another exemplary embodiment, the resin solution may include an organic solvent (as described above), a resol (as described above), and a photo active compound (PAC). In an exemplary embodiment, the photo active compound reacts with a beam used for exposure. The photo active compound may a compound of a Diazo Naphta Quinone (DNQ) type or a Naphta Quinone Diazine (NQD) type having a reactivity with a beam having a wave length of g-line or i-line. An exemplary DNQ type compound may be represented by Formula 2.

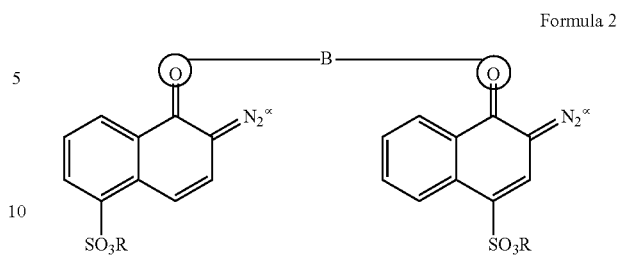

Formula 2

In an exemplary embodiment, the oxygen groups (O groups identified as B in Formula 2) of the DNQ type photo active compound may combine with hydroxyl groups (—OH groups identified as A in Formula 1) of the resol by a hydrogen bond. In an exemplary embodiment, these hydrogen bonds are broken by irradiating a beam such as g-line or i-line exposure beam. Therefore, in exemplary resin solution embodiments with a photo active compound, the resin solution may have exposure characteristics similar to a photoresist. For example, an exemplary resin solution including a photo active compound may be hard baked to form a cured resin layer. Further, the cured resin layer may be selectively exposed by a conventional photolithography process and the exposed region of the cured resin layer may be selectively removed by a developing solution.

In an exemplary embodiment, the resin solution includes an organic solvent of 40 wt % to 70 wt %, a resol of 30 wt % to 60 wt %, and a photo active compound of 3 wt % to 10 wt %.

In another exemplary embodiment, the resin solution may include an organic solvent, a resol, a cross-linking agent and a photo active compound (PAC), all as described above. In an exemplary embodiment, the resin solution includes an organic solvent of 40 wt % to 70 wt %, a resol of 30 wt % to 60 wt %, a cross-linking agent of 2 wt % to 10 wt %, and a photo active compound of 3 wt % to 10 wt %.

In another exemplary embodiment, the resin solution may include an organic solvent, a resol, a cross-linking agent, a photo active compound (all as described above), and a development accelerator. In an exemplary embodiment, the development accelerator may be a phenol type resin. In another exemplary embodiment, the resin solution includes an organic solvent of 45 wt % to 65 wt %, a resol of 40 wt % to 50 wt %, a cross-linking agent of 2 wt % to 10 wt %, a photo active compound of 3 wt % to 10 wt % and a development accelerator of 1 wt % to 5 wt %.

FIG. 1 illustrates a method of forming a protection layer in accordance with an exemplary embodiment of the present invention. FIG. 2 to FIG. 6 explain the exemplary method of forming the protection layer of FIG. 1, in more detail. In an exemplary embodiment, the protection layer is a cured resin layer.

Referring to Element 1 of FIG. 1 and FIG. 2, a resin solution 20 including a resol 23 (in accordance with any of the embodiments discussed above) may be prepared. The resin solution 20 may be prepared by dissolving a solid resol 23 having benzene rings (for example, three or four) in an organic solvent 21. The resin solution 20 may further include at least one of a cross-linking agent 25 (in accordance with any of the embodiments discussed above) and a photo active compound 27 (also in accordance with any of the embodiments discussed above).

If the resin solution 20 includes a photo active compound 27, the resin solution 20 may also include a development accelerator 29. If the resin solution 20 includes a DNQ type compound as the photo active compound 27, the DNQ type compound may be used to form hydrogen bonds by interacting with the hydroxyl groups (—OH groups) of the resol 23.

Referring to Element 3 of FIG. 1 and FIG. 3, the resin solution 20 may be coated on a semiconductor device. In an exemplary embodiment, the resin solution 20 may be coated using an apparatus, such as spin coater. As shown in FIG. 3, the substrate may include an inter-layer dielectric 33 formed on a semiconductor substrate 31, pads 35 formed on the inter-layer dielectric 33, and a passivation layer 37 covering the pads 35 and the surface of the inter-layer dielectric 33. The passivation layer 37 may have a pad window 37a exposing the pads 35. The resin solution 20 may be coated on the passivation layer 37 and the pads 35. In an exemplary embodiment, the passivation layer 37 may be formed by sequentially stacking a CVD oxidation layer and a CVD nitride layer.

Referring to Element 5 of FIG. 1 and FIG. 3, the resin solution 20 can be soft baked at a lower temperature of about 50° C. to 100° C. to evaporate a portion of the organic solvent 21 in the resin solution 20 and form a resin layer 20a, as shown in FIG. 3. The soft bake element may be required if the resin solution 20 contains a photo active compound 27. During the soft bake, the photo active compound 27 combines with the resol 23 of the resin solution 20 by hydrogen bond and may prevent unwanted exposure of a non-exposed region 20a via subsequent exposure.

Figure 4:
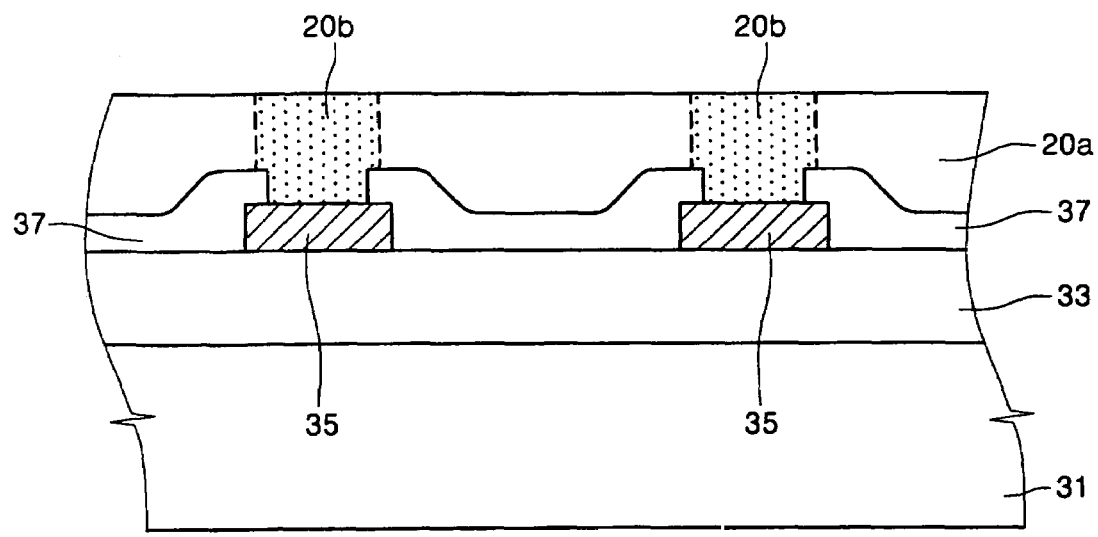

Referring to Element 7 of FIG. 1 and FIG. 4, a region 20b of the resin layer 20a may be selectively exposed. In an exemplary embodiment, using a mask and a beam having a wave length of g-line or i-line may be selectively irradiated onto the resin layer 20a on the pads 35. As a result, an exposed region 20b on the pads 35 may be formed.

In exemplary embodiments where the photo active compound 27 is reactive to a g-line or i-line beam, hydrogen bond between the photo active compound 27 and the resol 23 may be broken by the g-line or i-line energy. In another exemplary embodiment, if the photo active compound 27 is a DNQ type compound, the DNQ type compound may be transformed into an Indene Carboxylic Acid (ICA) (represented by Formula 3) by the g-line or i-line beam, where R is an alkyl group have an aromatic structure (ballast group).

Formula 3

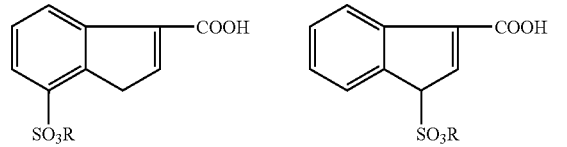

Figure 5:
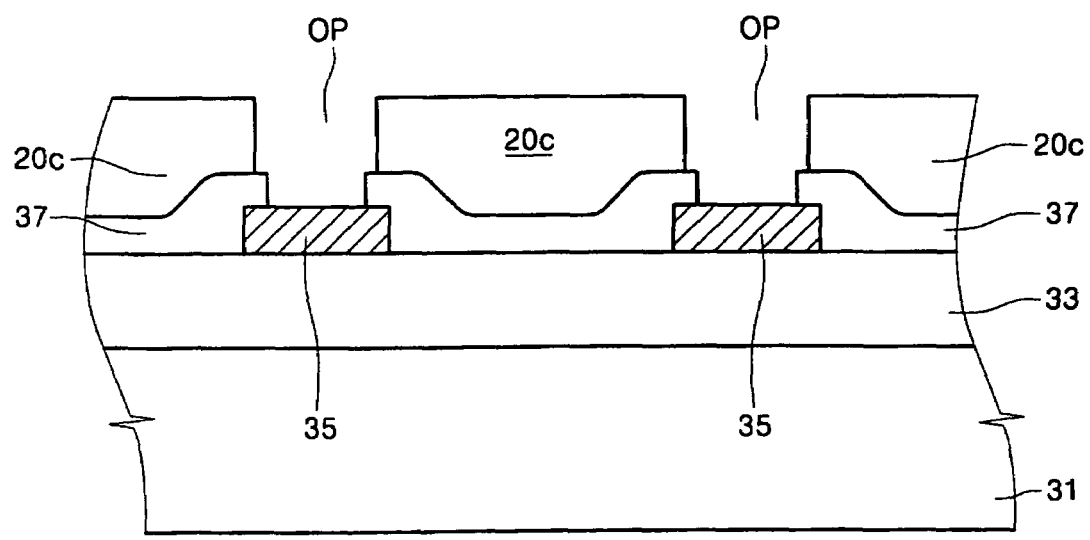

Referring to Element 7 of FIG. 1 and FIG. 5, the resol 23 and the photo active compound 27 in the exposed region 20b may be selectively removed by injecting a developer. During the injection of the developer, the resol 23 and the photo active compound 27 in non-exposed region are not removed by the developer because the resol 23 and the photo active compound 27 are bonded together by hydrogen bonds. A resin layer pattern 20c including openings (OP) exposing pads 35, are formed. Because the resin solution 21 includes a development accelerator 29 (for example, a phenol type resin), a profile of the resin layer pattern 20c may be improved by increasing the velocity of dissolution in the exposed region 20b and thereby reducing the developing loss of the non-exposed region.

In other exemplary embodiments, the exposure and development (Elements 7 and 9 in FIG. 1) may be omitted if patterning the resin layer (shown as 20a of FIG. 3) is not required. In such exemplary embodiments, it may be desirable that the resin solution 20 is a mixture of an organic solvent 21 and a resol 23, or a mixture of a resol 23 and a cross-linking compound 25. In other exemplary embodiments, the exposure, development, and the soft bake may be omitted if patterning the resin layer (shown as 20a of FIG. 3) is not required.

Figure 6:
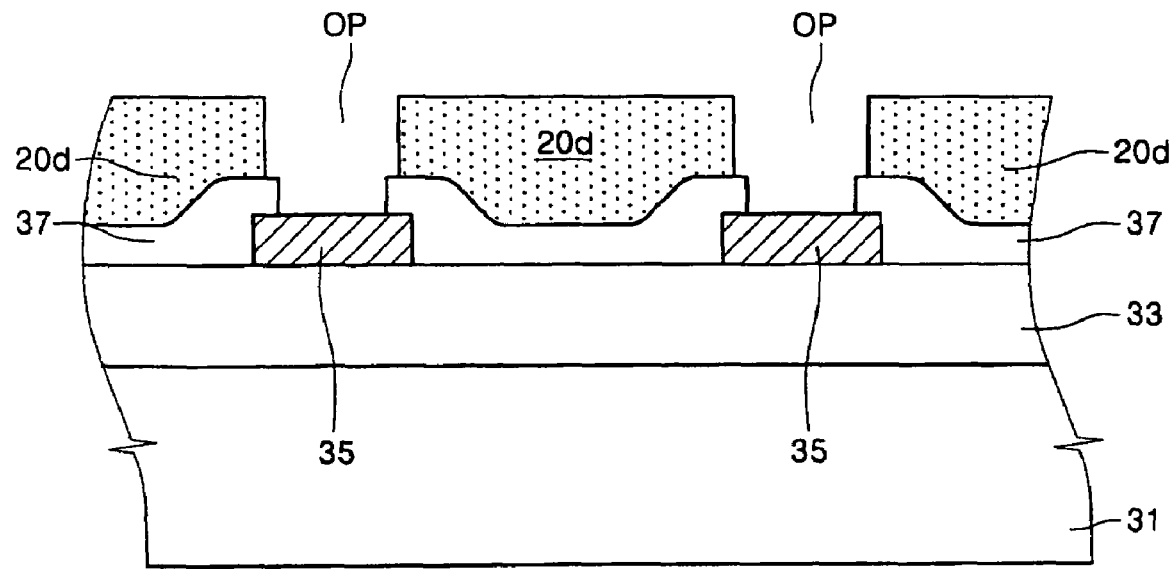

Referring to Element 11 of FIG. 1 and FIG. 6, the resin layer pattern 20c may be hardened by a hard bake. The hard bake may be performed at a lower temperature of about 120° C. to 250° C. The hard bake may generate the cross-linking reaction in the resin layer pattern 20c, to thereby form the cured resin layer 20d. In an exemplary embodiment, the hard bake is performed at a temperature of 150° C. to 200° C. In another exemplary embodiment, the cross-linking reaction of the resol molecules may still occur even if a resin solution 20 including a resol 23 does not include a cross-linking agent 25. For example, in exemplary embodiments, methylol groups (—CH2OH) at reaction sites of the resol molecules may interact with each other, therefore forming a cross-linked resin layer. In such exemplary embodiments, the reaction of the methylol groups may generate water, and the water may be evaporated out of the cross-liked resin layer. In an exemplary embodiment, the cured resin layer 20d may be represented by Formula 4.

Formula 4

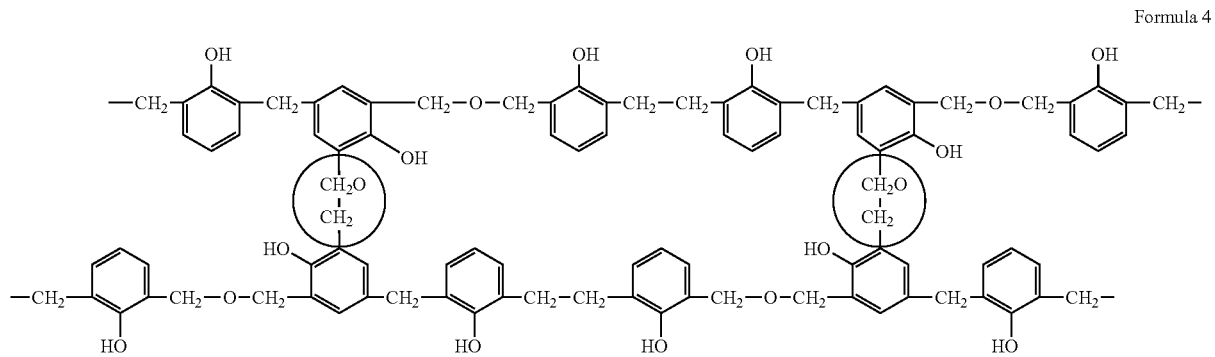

In exemplary embodiments where the resin solution 20 includes a resol 23 and a cross-linking agent 25, the cured resin layer 20d may be represented by exemplary Formula 5.

Formula 5

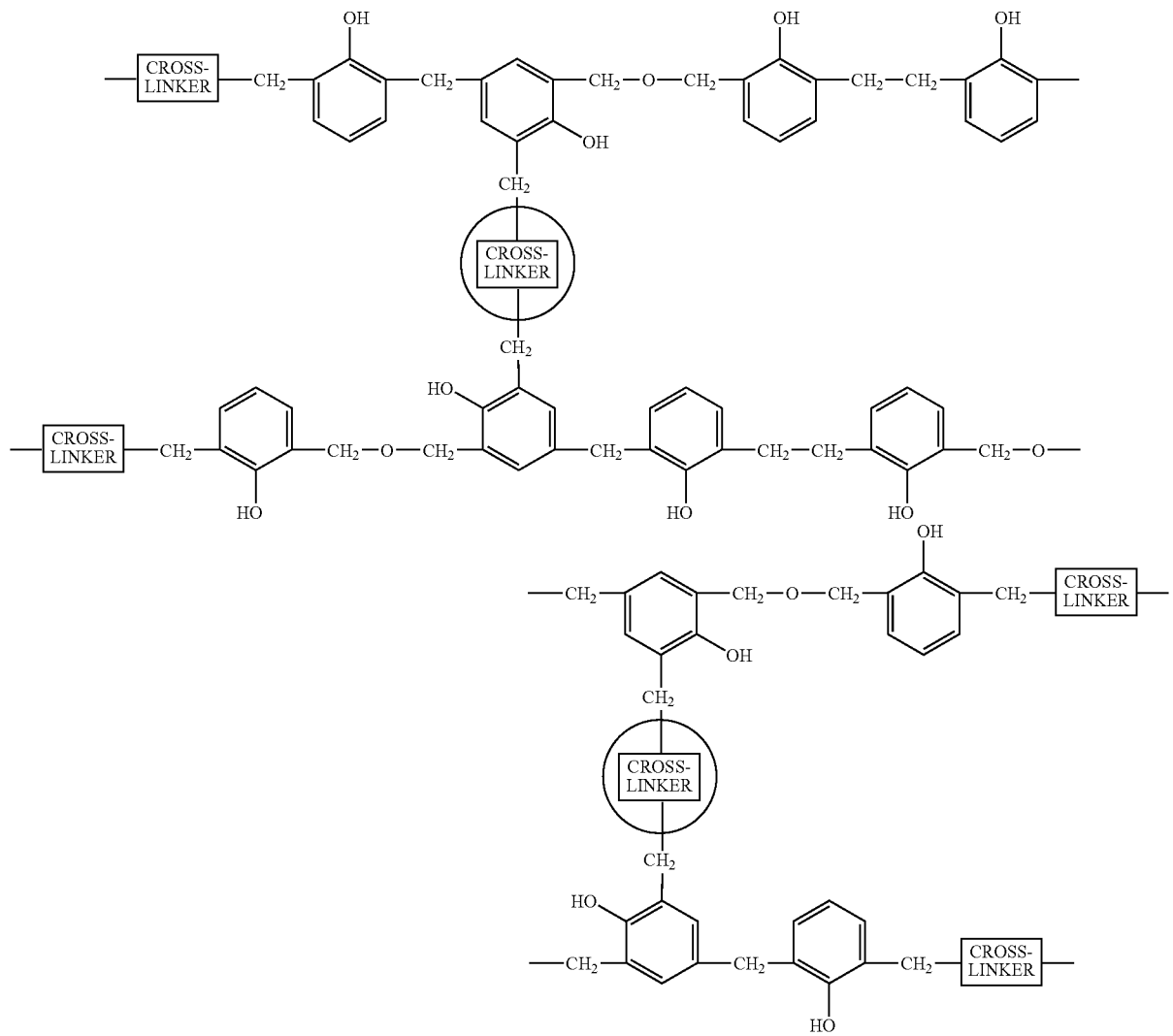

Exemplary embodiments where methylol groups (—CH2OH) of the resol molecules of Formula 1 are cross-linked with each other by a cross-linking agent 25 as the single-bonded ethyl groups (CH—CH2-) may be represented by exemplary Formula 6.

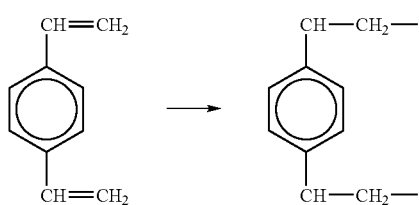

Formula 6

In exemplary embodiments where the resin solution 20 includes a cross-linking agent 25, a temperature of the hard bake may be dependent on the cross-linking agent 25. For example, if the cross-linking agent 25 is a DVB represented by Formula 6, the hard bake temperature may be about 70° C. or higher because the DVB is cross-linked with the resol molecule at a temperature higher than 70° C. More specifically, double-bonded ethyl groups (CH=CH2) of the DVB change to single-bonded ethyl groups (CH—CH2-) at a temperature over 70° C. Because these single-bonded ethyl groups are unstable, the single-bonded ethyl groups may be cross-linked by reacting with the reaction sites (methylol groups or hydroxyl groups) of the resol 23.

In exemplary embodiments where the cross-linking agent 25 is a chloroendic anhydride, the cross-linking reaction may occur at a temperature of about 90° C. to 130° C. For example, if the resin solution 20 includes chloroendic anhydride, the hard bake temperature may be about 90° C. to 130° C.

In exemplary embodiments where the cross-linking agent 25 is a phenol-formaldehyde, the cross-linking reaction may occur at a temperature over 180° C. For example, if the resin solution 20 includes phenol-formaldehyde, the hard bake temperature may be about 180° C. to 200° C.

Figure 7:
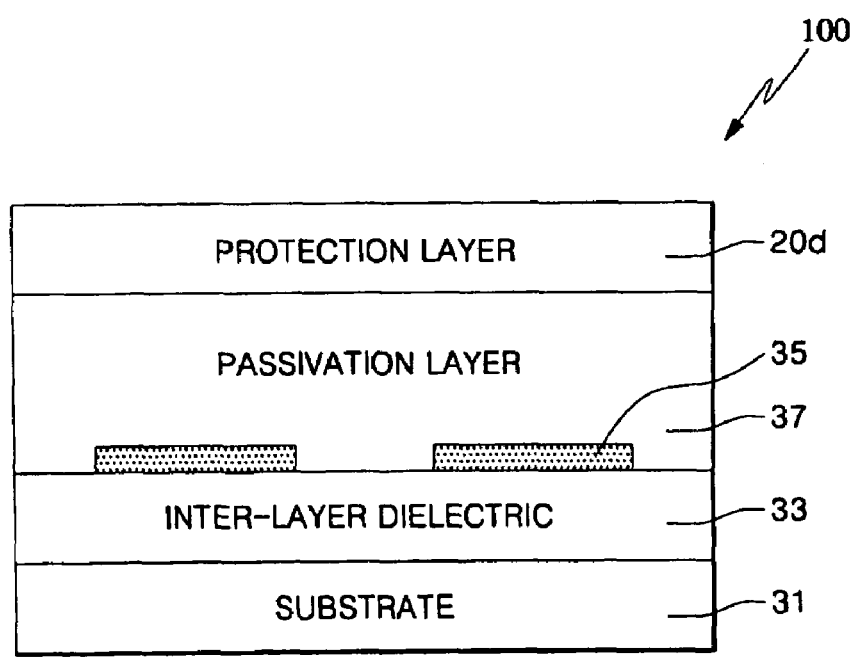
FIG. 7 illustrates a semiconductor device in accordance with an exemplary embodiment of the present invention.

FIG. 7 illustrates a semiconductor device 100 in accordance with an exemplary embodiment of the present invention. As shown, the semiconductor device 100 may include a protection layer, such as the cured resin layer 20d. The semiconductor device 100 may also include a semiconductor substrate 31, an inter-layer dielectric 33 with pads 35 formed thereon, and a passivation layer 37 covering the pads 35 and the surface of the inter-layer dielectric 33.

Although exemplary embodiments are described in the context of a resol resin, the resin may be a resol resin and/or a novolac resin.

It will be apparent to those skilled in the art that other changes and modifications may be made in the above-described exemplary embodiments without departing from the scope of the invention herein, and it is intended that all matter contained in the above description shall be interpreted in an illustrative and not a limiting sense.

What is claimed is:

1. A resin solution usable for forming a protection layer, comprising:
an organic solvent; and
a resol resin, wherein the resol resin has a molecular structure of

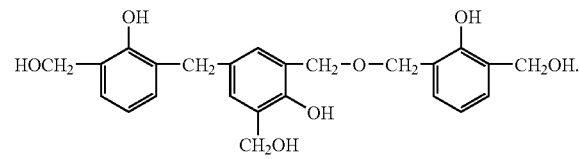

2. The resin solution of claim 1, wherein the organic solvent is at least one of PGME, PGMEA, EL, GBL, cyclohexane, and combinations thereof.

3. The resin solution of claim 1, wherein the resin solution is 40-80% organic solvent and 20-60% resol resin by weight.

4. The resin solution of claim 2, wherein the resin solution is 40-80% organic solvent and 20-60% resol resin by weight.

5. The resin solution of claim 1, wherein the resol resin has a weight average molecular weight of 800-20,000 in a solid state.

6. The resin solution of claim 1, further comprising:
a cross-linking agent.

7. The resin solution of claim 6, wherein the cross-linking agent is at least one of DXTB, chloroendic anhydride, phthalic anhydride, tetrahydrophthalic, nadic methyl, phenol-formaldehyde, hexamethylenetetamine, and combinations thereof.

8. The resin solution of claim 6, wherein the resin solution is 40-70% organic solvent, 30-60% resol resin, and 2-10% cross-linking agent by weight.

9. The resin solution of claim 1, further comprising:
a photoactive compound.

10. The resin solution of claim 9, wherein the resin solution is 40-70% organic solvent, 30-60% resol resin, and 3-10% photoactive compound by weight.

11. A composition usable for forming a protection layer, comprising:
an organic solvent;
a resol resin;
a cross-linking agent; and
a photo active compound, wherein the resol resin has a molecular structure of

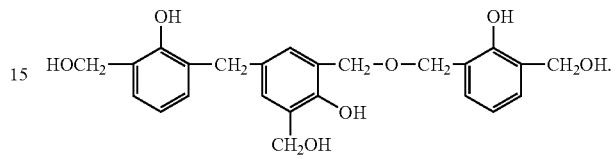

12. The composition of claim 11, wherein the organic solvent is at least one of PGME, PGMEA, EL, GBL, cyclohexane, and combinations thereof.

13. The composition of claim 11, wherein the composition is 40-70% organic solution, 30-60% resol resin, 2-10% cross-linking agent, and 3-10% photoactive compound by weight.

14. The composition of claim 12, wherein the composition is 40-70% organic solution, 30-60% resol resin, 2-10% cross-linking agent, and 3-10% photoactive compound by weight.

15. The composition of claim 11, wherein the resol resin has a weight average molecular weight of 800-20,000 in a solid state.

16. The composition of claim 11, wherein the cross-linking agent is at least one of DXTB, chloroendic anhydride, phthalic anhydride, tetrahydrophthalic, nadic methyl, phenol-formaldehyde, hexamethylenetetamine, and combinations thereof.

17. The composition of claim 16, wherein the composition is 40-70% organic solution, 30-60% resol resin, 2-10% cross-linking agent, and 3-10% photoactive compound by weight.

18. The composition of claim 11, further comprising:
a development accelerator.

19. The composition of claim 18, wherein the development accelerator is a phenol-type resin.

20. The composition of claim 18, wherein the development accelerator reduces film loss.

21. The composition of claim 18, wherein the organic solvent is at least one of PQME, PGMEA, EL, GEL, cyclohexane, and combinations thereof.

22. The composition of claim 18, wherein the resol resin has a weight average molecular weight of 800-20,000 in a solid state.

23. The composition of claim 18, wherein the cross-linking agent is at least one of DVB, chloroendic anhydride, phthalic anhydride, tetraliydrophthalic, nadic methyl, phenol-formaldehyde, hexamethylenetetamine, and combinations thereof.

24. The composition of claim 18, wherein the composition is 45-65% organic solution, 40-50% resol resin, 2-10% cross-linking agent, 3-10% photoactive compound, and 1-5% development accelerator by weight.

* * * * *